(12) United States Patent
Matsubara

(10) Patent No.: US 8,067,106 B2
(45) Date of Patent: Nov. 29, 2011

(54) FUEL CELL

(75) Inventor: Junichi Matsubara, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 716 days.

(21) Appl. No.: 12/087,260

(22) PCT Filed: Jan. 24, 2007

(86) PCT No.: PCT/JP2007/051530
§ 371 (c)(1),
(2), (4) Date: Jun. 30, 2008

(87) PCT Pub. No.: WO2007/088864
PCT Pub. Date: Aug. 9, 2007

(65) Prior Publication Data
US 2011/0003227 A1    Jan. 6, 2011

(51) Int. Cl.
*H01M 14/00* (2006.01)
(52) U.S. Cl. ............ 429/7; 429/427; 429/428; 429/430; 429/431; 429/432; 429/517
(58) Field of Classification Search ............ 429/7, 431, 429/427, 428, 430, 432, 517
See application file for complete search history.

(56) References Cited

FOREIGN PATENT DOCUMENTS

| JP | 57-188261 U | 11/1982 |
|----|----|----|
| JP | 61-42876 A | 3/1986 |
| JP | 03-105873 A | 5/1991 |
| JP | 10-255829 | * 9/1998 |
| JP | 10-255829 A | 9/1998 |
| JP | 2002-367666 A | 12/2002 |
| JP | 2007-87678 A | 4/2007 |

* cited by examiner

*Primary Examiner* — Patrick Ryan
*Assistant Examiner* — Ben Lewis
(74) *Attorney, Agent, or Firm* — Kenyon & Kenyon LLP

(57) ABSTRACT

Disclosed is a fuel cell including a fuel cell stack; a stack case which contains the fuel cell stack; and a blocking device including connecting portions which electrically connect, to output terminal portions of the fuel cell stack, output cables to transmit the output of the fuel cell stack to a device provided outside the stack case, the blocking device being capable of blocking the mutual connection performed by the mechanical operation of the connecting portions from the outside of the stack case. Moreover, at least a portion of the blocking device in which the output cables are electrically connected to the connecting portions is arranged outside the stack case.

5 Claims, 6 Drawing Sheets

FUEL CELL

This is a 371 national phase application of PCT/JP2007/051530 filed 24 Jan. 2007, which claims priority of Japanese Patent Application No. 2006-023564 filed 31 Jan. 2006, the contents of which are incorporated herein by reference.

TECHNICAL FIELD

The present invention relates to a fuel cell including a blocking device capable of blocking an output from a fuel cell stack to an external device by a mechanical operation outside a stack case.

BACKGROUND ART

In recent years, a fuel cell car and the like using a fuel cell as an energy source have received attention, the fuel cell being configured to generate a power by an electrochemical reaction between a fuel gas and an oxidizing gas. This fuel cell usually includes a fuel cell stack provided with a cell laminate in which the required number of cells are laminated, the cells being configured to generate the power by the electrochemical reaction between the fuel gas and the oxidizing gas, and the outer periphery of this fuel cell stack is covered with a stack case.

Moreover, this fuel cell provided with a so-called service plug is known, and the plug functions as a current block unit which electrically blocks output cables and the fuel cell stack in a case where the fuel cell stack is subjected to maintenance and inspection (e.g., see Japanese Patent Application Laid-Open No. 2002-367666).

DISCLOSURE OF THE INVENTION

This type of fuel cell has a structure in which fixing portions are provided in a stack case, and a service plug attachable/detachable from the outside of the stack case is attached to this fixing portion so that the plug is exposed from the stack case. Furthermore, output cables for supplying the output of the fuel cell to an external device such as a power control unit provided outside the stack case are connected to the fixing portions provided in the stack case.

Therefore, during the assembly of the fuel cell, the output cables and the service plug have to be fixed to the fixing portions inside and outside the stack case, respectively, which results in a problem that the number of assembly steps increases. In particular, the output cables have to be connected to the inside of the stack case, which is a factor to disturb a satisfactory assembly property.

The present invention has been developed in view of the above situation, and an object is to provide a fuel cell including a blocking device capable of improving an assembly property.

To achieve the above object, according to the present invention, there is provided a fuel cell comprising: a fuel cell stack; a stack case which contains the fuel cell stack; and a blocking device including connecting portions which electrically connect, to output terminal portions of the fuel cell stack, the output cables to transmit the output of the fuel cell stack to a device provided outside the stack case, the blocking device being configured to block the mutual connection performed by the mechanical operation of the connecting portions from the outside of the stack case, wherein at least a portion of the blocking device in which the output cables are electrically connected to the connecting portions is arranged outside the stack case.

According to this constitution, the connecting or fixing operation of the output cables in the stack case during the assembly of the fuel cell can be omitted, whereby an assembly property can be improved.

In a constitution in which the blocking device includes a main body portion to be fixed to the outer surface of the stack case, and an operating portion including the connecting portions and being configured to be mechanically operated from the outside of the stack case, the output cables may be connected to the side of the main body portion or the operating portion.

Further in such a constitution, a housing of the main body portion may be formed of the same material as that of the stack case.

In particular, in a case where the housing of the main body portion and the stack case are formed of a conductor such as aluminum, for example, in the constitution in which the output cables are connected to the side of the main body portion, this main body portion can be grounded via the stack case with respect to the body of a vehicle or the like in which the stack case is installed. In the constitution in which the output cables are connected to the side of the operating portion, this operating portion can be grounded via the main body portion and the stack case with respect to the body of the vehicle or the like, whereby safety can be improved.

According to the fuel cell of the present invention, at least the portion of the blocking device in which the output cables are electrically connected to the connecting portions is arranged outside the stack case, so that the assembly property can be improved.

BEST MODE FOR CARRYING OUT THE INVENTION

A first embodiment of a fuel cell according to the present invention will be described with reference to FIGS. 1 and 2.

Figure 1:
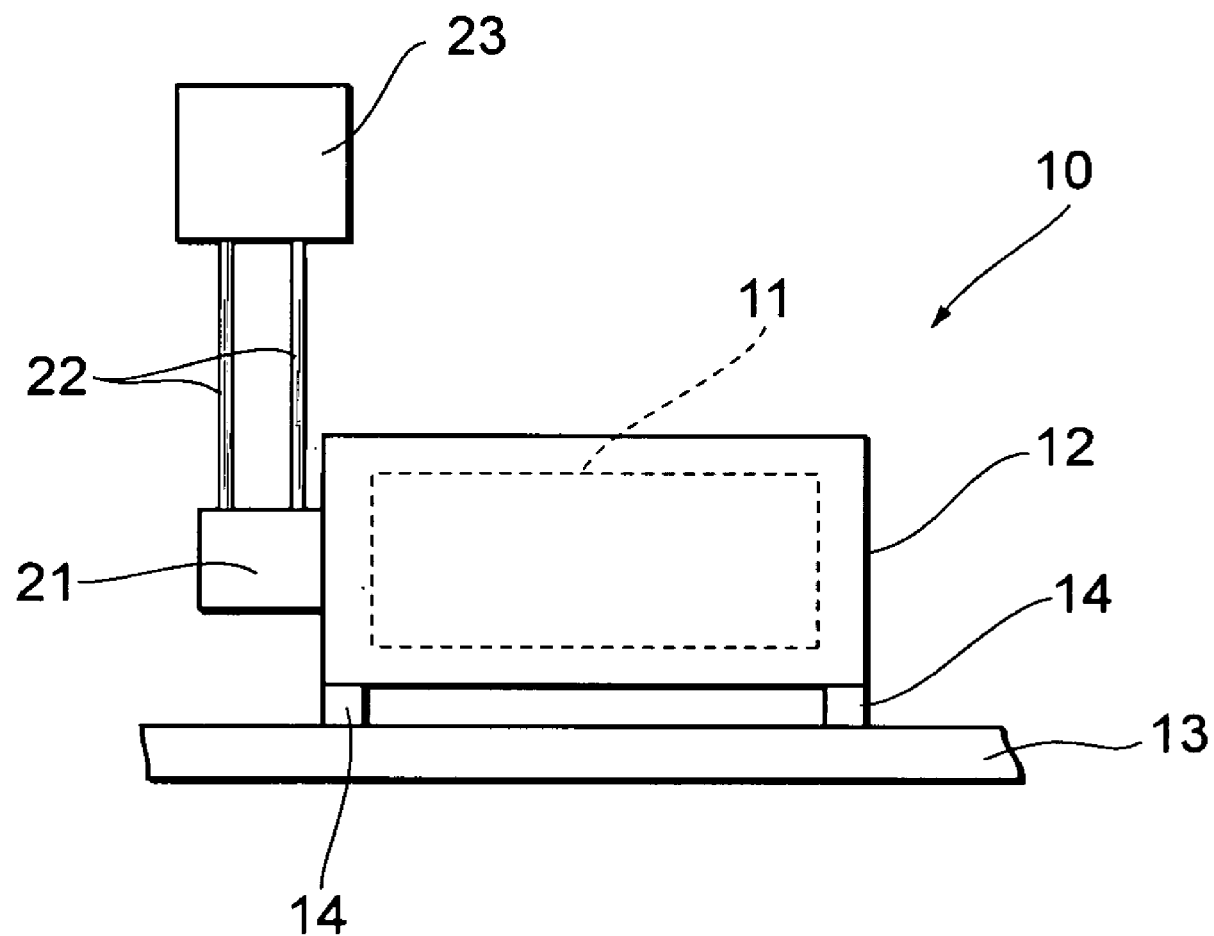
FIG. 1 is a schematic constitution diagram showing the constitution of a fuel cell.

FIG. 1 shows a fuel cell 10. This fuel cell 10 is applicable to a car-mounted power generation system for a fuel cell car, a power generation system for any mobile body such as a ship, an airplane, a train or a walking robot, further a stational type power generation system for use as a power generation equipment for a construction (a housing, a building or the like) or the like, but the fuel cell is specifically used in a car.

As shown in FIG. 1, the fuel cell 10 has a fuel cell stack 11 including a cell laminate in which the required number of cells are laminated, the cells being configured to generate a power by an electrochemical reaction between a fuel gas and an oxidizing gas, and a stack case 12 which is made of, for example, aluminum and which covers the outer periphery of this fuel cell stack 11.

Moreover, this fuel cell 10 is supported by frames 14 made of, for example, aluminum with respect to a car body 13 constituted of an iron plate or the like. Furthermore, a blocking device 21 is provided on the outer surface of the stack case 12 of this fuel cell 10, and output cables 22 connected to this blocking device 21 are connected to a power control unit 23 provided outside the stack case 12.

It is to be noted that although not shown, this power control unit 23 includes an inverter which supplies the power to a driving motor of the car; an inverter which supplies the power to auxiliary devices such as a compressor motor and a hydrogen pump motor required for the operation of the fuel cell 10; a DC-DC converter which charges an electric storage device such as a secondary battery to supply the power from the electric storage device to the motors and the like.

Moreover, the output cables (power cables) 22 of the present embodiment are shield cables having conducting wires which transmit an output from the fuel cell stack 11 and outer conductors (e.g., a metal film and a metal mesh) provided so as to cover the conducting wires. The output cables 22 are attached to the blocking device 21 so that the outer conductors are connected to a housing of the blocking device 21.

Figure 2:
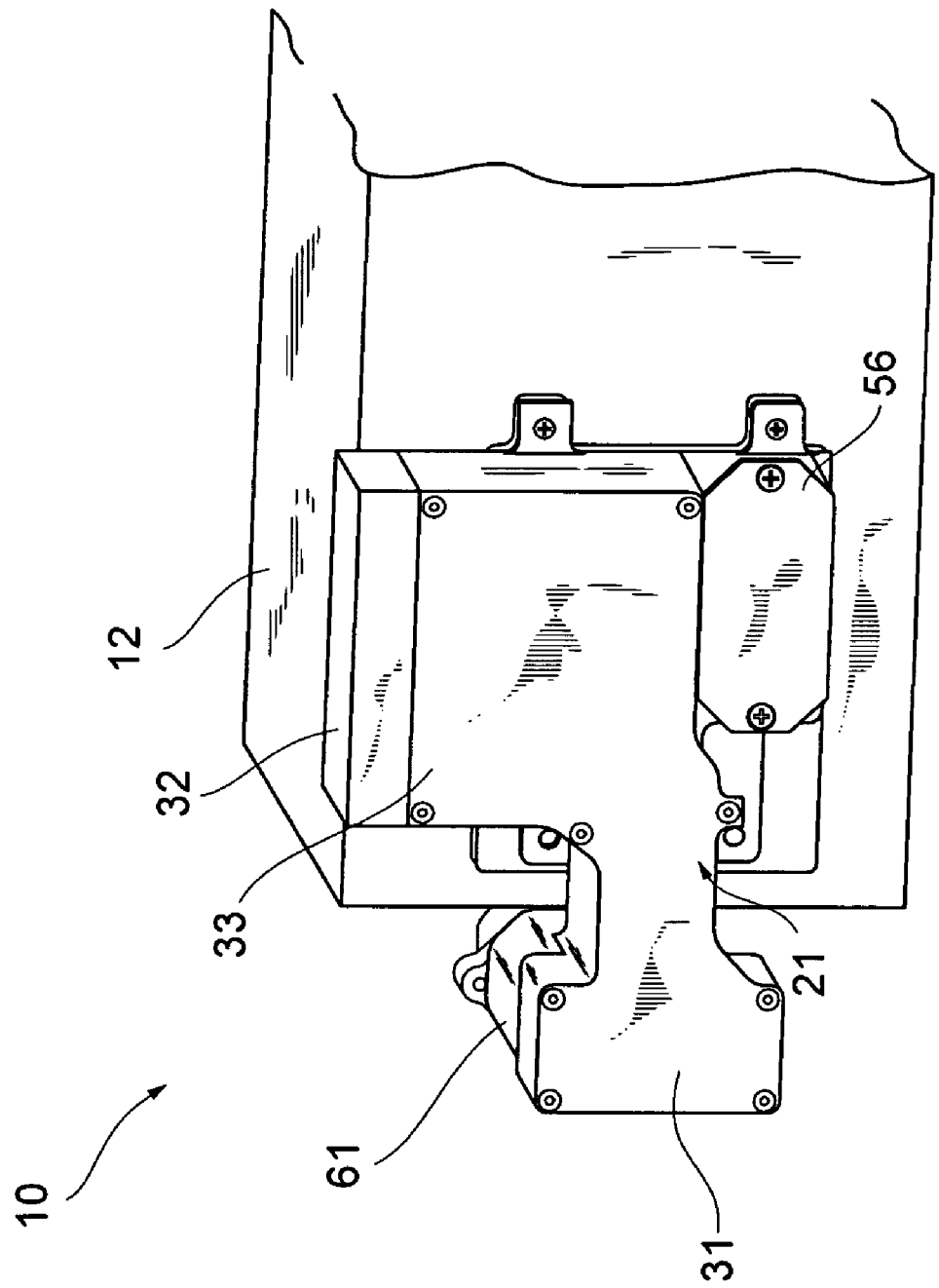
FIG. 2 is a perspective view showing the fuel cell including a blocking device.
Figure 3:
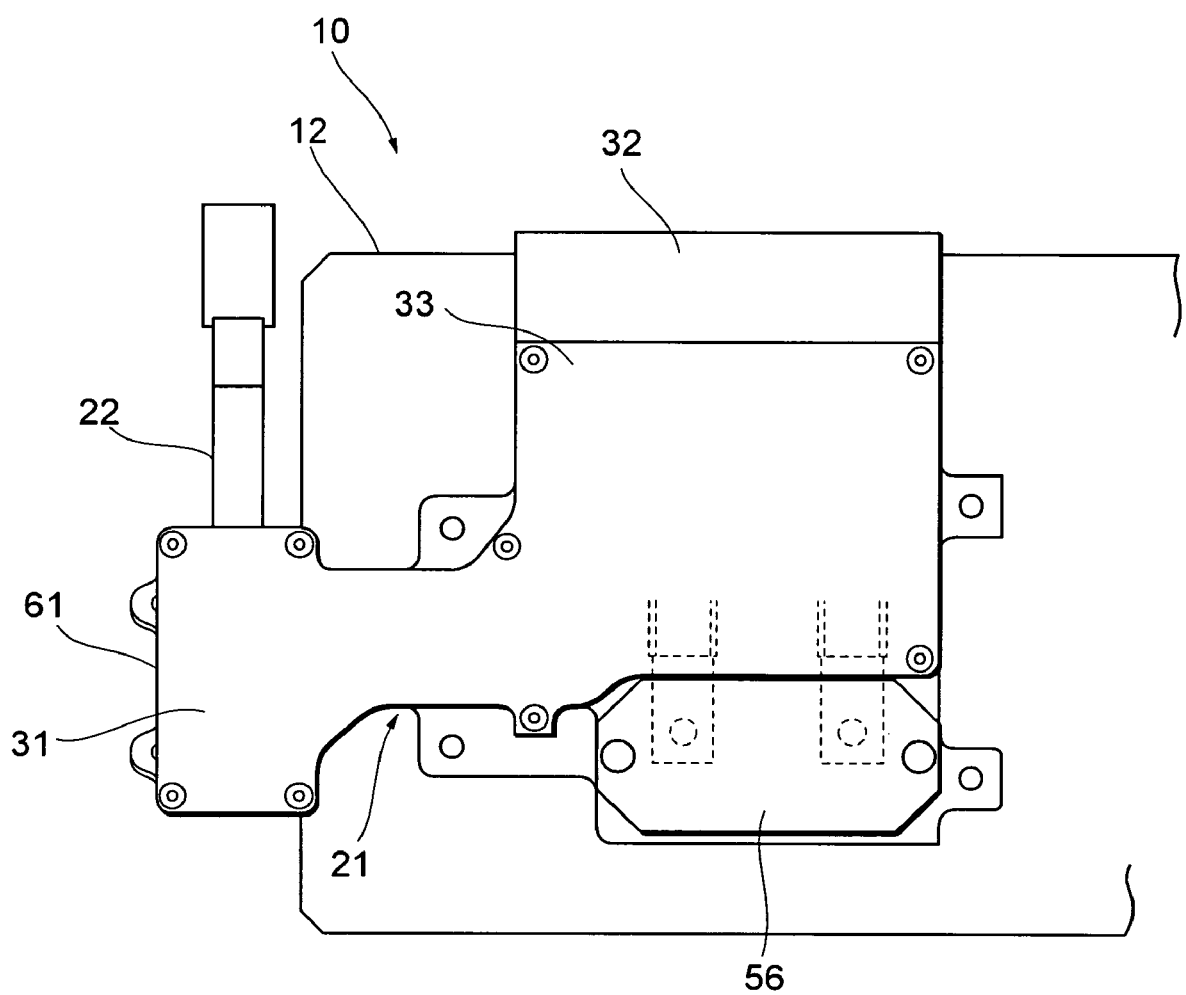
FIG. 3 is a front view showing the fuel cell including the blocking device.

As shown in FIGS. 2 and 3, the upper portion of the blocking device 21 is a plug attachable/detachable portion (a main body portion) 33, and a service plug (an operating portion) 32 is detachably attached to this plug attachable/detachable portion 33 by a mechanical operation from the outside of the stack case 12. The housing of this blocking device 21 is constituted of a rigid body formed by cutting aluminum into a frame-like shape, and a cover 31 is attached to the front surface of the housing via screws.

Figure 4:
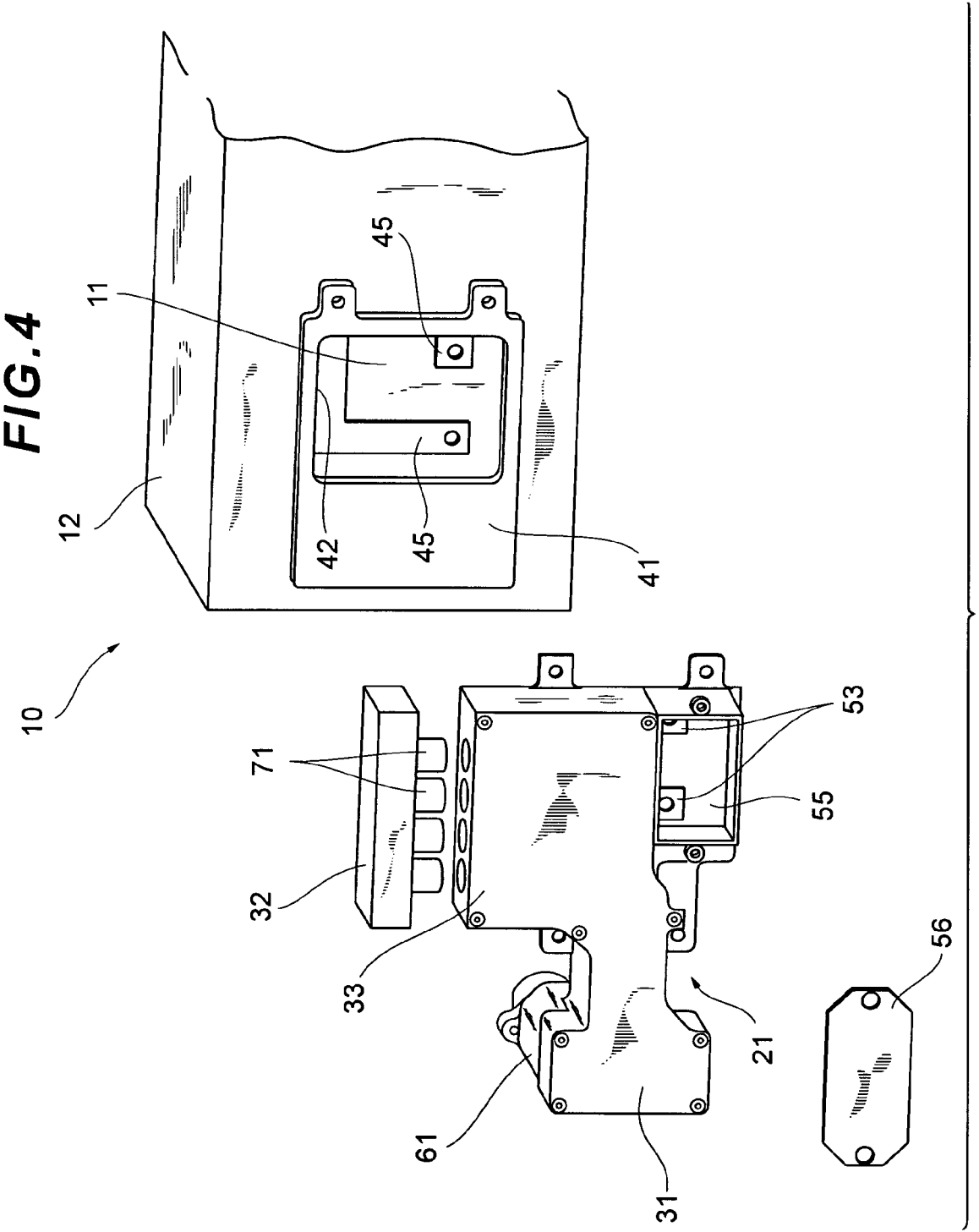
FIG. 4 is an exploded perspective view showing the structure of the blocking device.

As shown in FIG. 4, the blocking device 21 is attached to an attachment portion 41 provided on one side portion of the stack case 12 via screws, and the blocking device 21 is attached to this attachment portion 41 to cover, from the outside, a first through hole 42 formed in the attachment portion 41 with the blocking device 21.

Moreover, in the first through hole 42 of the stack case 12, output bus bars 45 connected to the fuel cell stack 11 in the stack case 12 via a relay (not shown) are exposed.

Figure 5:
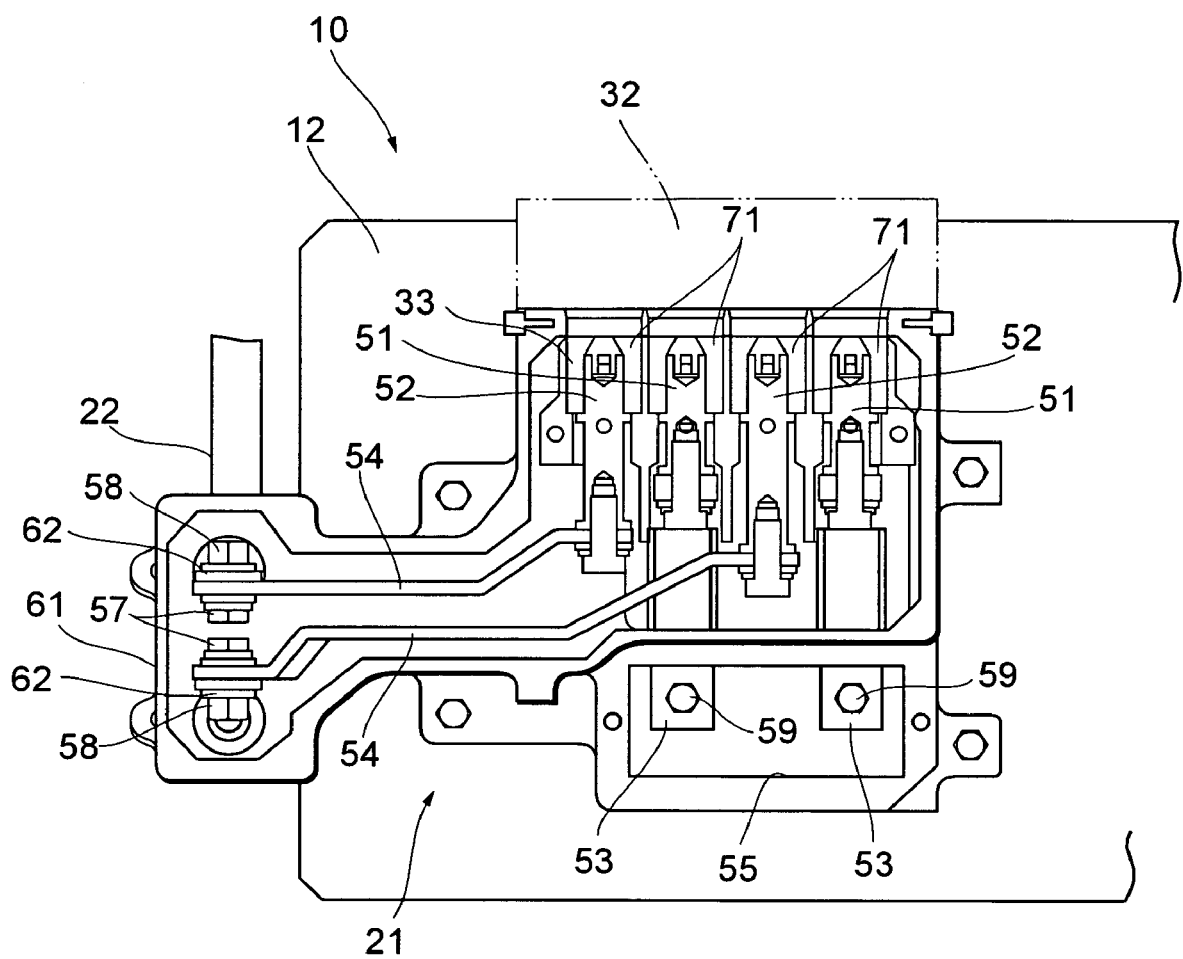
FIG. 5 is a vertically sectional view showing the inner structure of the blocking device.

As shown in FIG. 5, the blocking device 21 is provided with a pair of input terminals 51 and a pair of output terminals 52, respectively, and the input terminals and the output terminals are alternately arranged so as to protrude toward the plug attachable/detachable portion 33. The input terminals 51 are connected to connection bus bars 53, and the output terminals 52 are connected to linking bus bars 54. The connection bus bars 53 are bent toward the inside of the stack case 12, and further downwardly extended.

Thus, in the present embodiment, these input terminals 51 and connection bus bars 53 constitute one example of an output terminal section of the fuel cell stack in the present invention.

On the downside of the blocking device 21, a second through hole 55 is formed which constitutes a hole for maintenance and inspection (a so-called service hole) connected to the first through hole 42 formed in the attachment portion 41 of the stack case 12, whereby the stack case 12 is accessible from the outside. This second through hole 55 is connected to the ends of the connection bus bars 53 as viewed in a plane.

One side portion of the blocking device 21 is provided with a cable connecting portion (a main body portion) 61. A pair of terminals 62 are arranged in this cable connecting portion 61, and these terminals 62 are connected to the link bus bars 54 via bolts 57 and nuts 58. The output cables 22 connected to the power control unit 23 are fixed to the cable connecting portion 61, and conducting wires of these output cables 22 are connected to the terminals 62.

Thus, in the present embodiment, the terminals 62 and the link bus bars 54 constitute one example of a portion in which the output cables are electrically connected to the connecting portion.

The service plug 32 attached to the plug attachable/detachable portion 33 of the blocking device 21 include four connection terminals 71, and this service plug 32 is attached to the plug attachable/detachable portion 33, whereby the input terminals 51 and the output terminals 52 on the blocking device 21 side are fitted into the connection terminals 71 of this service plug 32. In consequence, the input terminals 51 and the output terminals 52 arranged adjacent to each other are made in conduction via the service plug 32.

Thus, in the present embodiment, these connection terminals 71 constitute one example of connecting portions which electrically connect the output cables to the output terminal portions in the blocking device according to the present invention. Furthermore, the plug attachable/detachable portion 33 and the cable connecting portion 61 constitute one example of the main body portion fixed to the outer surface of the stack case in the blocking device according to the present invention.

Furthermore, the blocking device of the present invention includes first terminals (the output terminals 52 in the present embodiment) electrically connected to a load (the power control unit 23 in the present embodiment); second terminals (the input terminals 51 in the present embodiment) disposed away from the first terminals and electrically connected to the output terminals (the connection bus bars 53 in the present embodiment) of the fuel cell stack 11; and conductors (the connection terminals 71 in the present embodiment) which make portions between the first terminals and the second terminals in conduction. These conductors are displaced between a position where the portions between the first terminals and the second terminals are made in conduction and a position where the portions are not made in conduction in accordance with a user's mechanical operation.

Moreover, the blocking device according to the present embodiment of the present invention has a base which supports the first and second terminals, and a housing including a cover which covers the second terminals and the like. Furthermore, the housing is a conductor connected to the stack case 12.

It is to be noted that as the blocking device of the present invention, in addition to a constitution in which the conductors can be separated from the blocking device main body (the plug attachable/detachable portion 33 and the cable connecting portion 61 in the present embodiment) as in the present embodiment, a constitution such as a so-called breaker is included in which the conductors are integrated with the blocking device main body so that the conductors can be displaced with respect to the portions between the first terminals and the second terminals.

When the blocking device 21 having the above-mentioned constitution is attached to one side part of the stack case 12 so as to cover the first through hole 42, the ends of the connection bus bars 53 are superimposed on the output bus bars 45 connected to the fuel cell stack 11. In this state, the connection bus bars 53 can be fastened and connected to the output bus bars 45 via bolts 59 in the second through hole 55.

Then, when the connection bus bars 53 and the output bus bars 45 are fastened in the second through hole 55, a closing lid 56 is attached so as to cover the second through hole 55, and this closing lid 56 is fixed via screws, whereby the first through hole 42 and the second through hole 55 constituting the holes for maintenance and inspection are closed with the closing lid 56 to seal the stack case 12.

In the fuel cell 10 including the blocking device 21, the power (output) generated in the fuel cell stack 11 is sent to the power control unit 23 disposed outside the stack case 12 from the output bus bars 45 via the connection bus bars 53, the service plug 32, the link bus bars 54 and the output cables 22.

As described above, according to the fuel cell 10 of the present embodiment, the blocking device 21 connected to the output cables 22 is attached to the outer surface of the stack case 12, so that the portions where the output cables 22 are electrically connected to the connection terminals 71 in the service plug 32, that is, the terminals 62 and the link bus bars 54 connected to the output cables 22 are arranged outside the stack case 12.

Therefore, during the assembly of the fuel cell 10, the connecting or fixing operation of the output cables 22 in the stack case 12 can be omitted, and an assembly property can be improved. Furthermore, the terminals 62 and the link bus bars 54 for electrically connecting the service plug 32 to the output cables 22 are received in the blocking device 21, so that the exposure of such connecting portions to the outside is avoided, and safety is improved.

Furthermore, the housing of the blocking device 21 is made of aluminum which is the same material as that of the stack case 12. Therefore, the blocking device 21 can be grounded (earthed) via the stack case 12 with respect to the body 13 of a vehicle on which the stack case 12 is installed, and the safety can be improved.

Moreover, the output cables 22 of the present embodiment are shield cables having conducting wires which transmit the output from the fuel cell stack 11 and outer conductors provided so as to cover the conducting wires as described above. When the output cables 22 are attached to the cable connecting portion 61 of the blocking device 21 or attached to the service plug 32 as described later, the outer conductors are provided so as to be connected to the cable connecting portion 61 or the housing of the service plug 32.

Therefore, the outer conductors of the output cables 22 are earthed with respect to the vehicle body or the like via the stack case 12, the cable connecting portion 61 of the blocking device 21 or the service plug 32, so that the earth for suppressing the influence of noise in the output cables 22 can be realized with a simple constitution.

Figure 6:
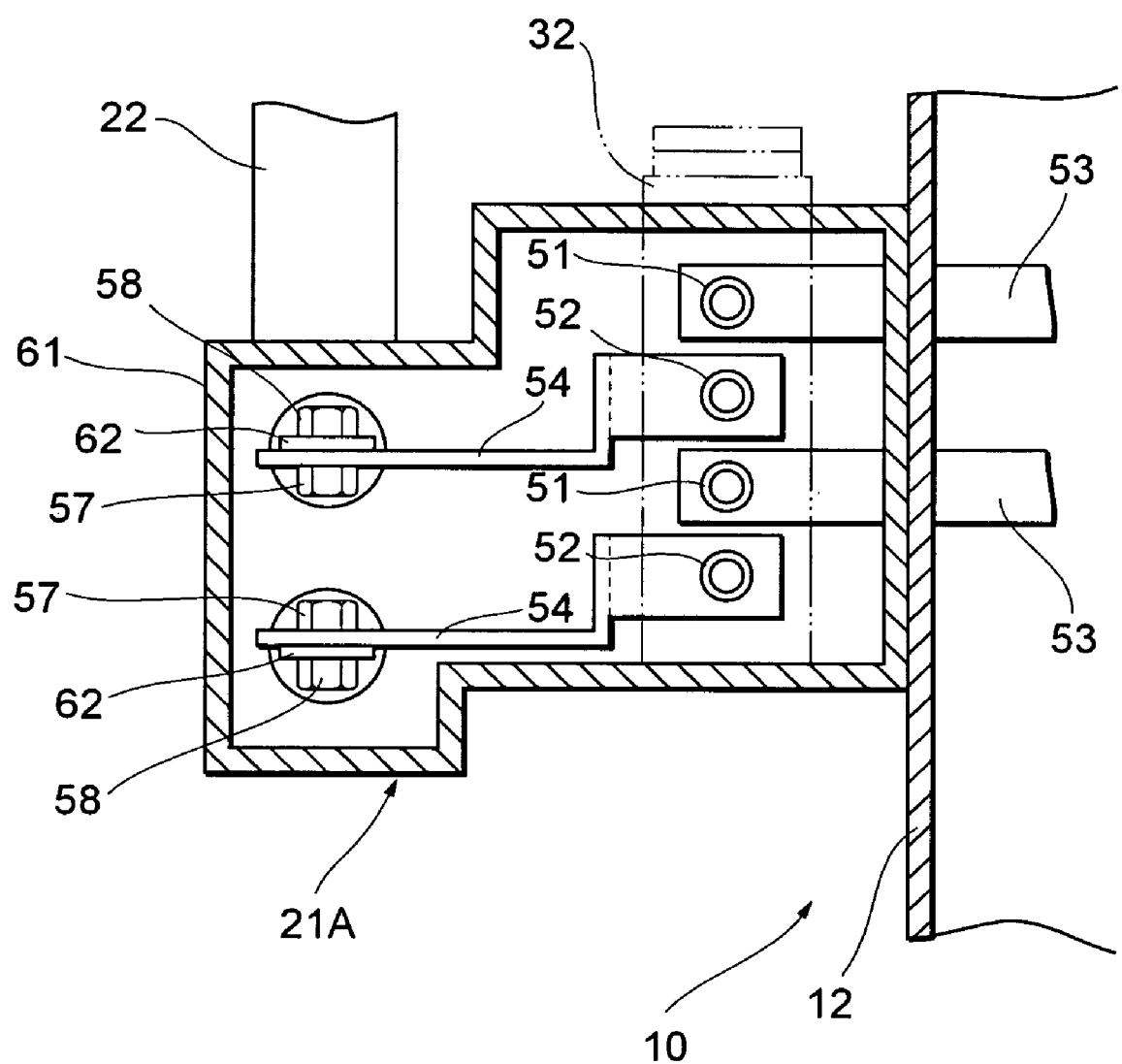
FIG. 6 is a transverse sectional view showing the inner structure of another blocking device.

It is to be noted that the blocking device 21 is not limited to the above embodiment. FIG. 6 shows a blocking device 21A according to another embodiment. As shown in the drawing, in this blocking device 21A, link bus bars 54 are arranged along a direction in which connection bus bars 53 extend. Moreover, according to the blocking device 21A having this structure, a width dimension can be decreased as compared with the above blocking device 21 in which the link bus bars 54 are arranged in a direction crossing the extending direction of the connection bus bars 53 at right angles.

Moreover, in the stack case 12 of the above embodiment, the example has been described in which the output cables 22 are connected to the cable connecting portion 61 attached to the stack case 12 together with the plug attachable/detachable portion 33. However, the output cables 22 may be connected to the service plug 32 side. In such a constitution, the assembly property can further effectively be improved.

The invention claimed is:

1. A fuel cell comprising:
a fuel cell stack;
a stack case which contains the fuel cell stack;
a blocking device provided on the outer surface of the stack case;
output cables which connect the blocking device to a device provided outside the stack case, and
stack-side output terminal portions which connect the fuel cell stack to the blocking device,
wherein the blocking device includes a main body portion and an operating portion which is attached to or detached from the main body portion by an attaching or detaching operation performed from the outside of the stack case; and
wherein the main body portion includes cable connection terminals connected to the output cables, blocking-device-side input terminal portions connected to the stack-side output terminal portions, and blocking-device-side output terminal portions connected to the cable connection terminals, the blocking-device-side input terminal portions and the blocking-device-side output terminal portions are not electrically connected in a state in which the operating portion is detached from the main body portion,
the operating portion includes connecting portions which electrically connect the blocking-device-side input terminal portions to the blocking-device-side output terminal portions in a case where the operating portion is attached to the main body portion,
wherein the main body portion further includes first and second terminals which are fitted into the connecting portions to be electrically connected with each other at a time when the operating portion is attached to the main body portion, connection bus bars connected to the second terminals and the stack-side output terminal portions, and link bus bars connected to the first terminals and the cable connection terminals,
the second terminals and the connection bus bars constitute the blocking-device-side input terminal portions, and
the first terminals and the link bus bars constitute the blocking-device-side output terminal portions.

2. The fuel cell according to claim 1, wherein a housing of the main body portion is formed of the same material as that of the stack case.

3. The fuel cell according to claim 1, wherein the housing of the main body portion and the stack case are made of aluminum.

4. A fuel cell according to claim 1, wherein the connection bus bars being superimposed on the stack side output terminal portions when the blocking device is mounted on the outer surface of the stack case.

5. A vehicle, comprising:
a vehicle body;
a fuel cell stack;
a stack case which contains the fuel cell stack connected to the vehicle body;
a blocking device provided on the outer surface of the stack case;
output cables which connect the blocking device to a power control unit provided outside the stack case, and
stack-side output terminal portions which connect the fuel cell stack to the blocking device,
wherein the blocking device includes a main body portion and an operating portion which is attached to or detached from the main body portion by an attaching or detaching operation performed from the outside of the stack case; and
wherein the main body portion includes cable connection terminals connected to the output cables, blocking-device-side input terminal portions connected to the stack-side output terminal portions, and blocking-device-side output terminal portions connected to the cable connection terminals, the blocking-device-side input terminal portions and the blocking-device-side output terminal portions are not electrically connected in a state in which the operating portion is detached from the main body portion, the operating portion includes connecting portions which electrically connect the blocking-device-side input terminal portions to the blocking-device-side output terminal portions in a case where the operating portion is attached to the main body portion, wherein the main body portion further includes first and second terminals which are fitted into the connecting portions to be electrically connected with each other at a time when the operating portion is attached to the main body portion, connection bus bars connected to the second terminals and the stack-side output terminal portions, and link bus bars connected to the first terminals and the cable connection terminals, the second terminals and the connection bus bars constitute the blocking-device-side input terminal portions, and the first terminals and the link bus bars constitute the blocking-device-side output terminal portions.

* * * * *